(No Model.)
2 Sheets—Sheet 1.
J. W. BAPPLE.
COMBINED SELF DROPPING CORN PLANTER AND CHECK ROWER.
No. 283,459. Patented Aug. 21, 1883.
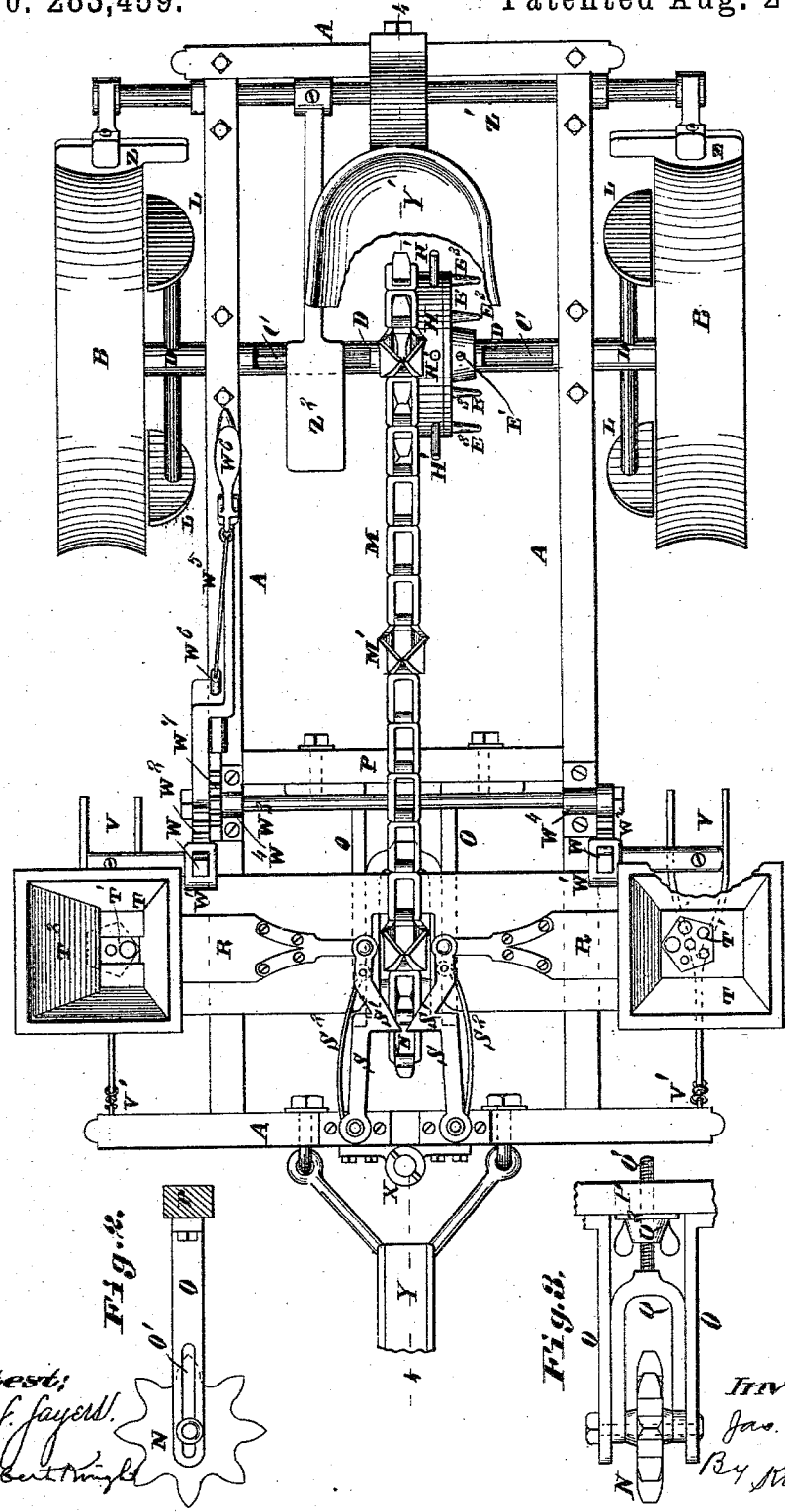

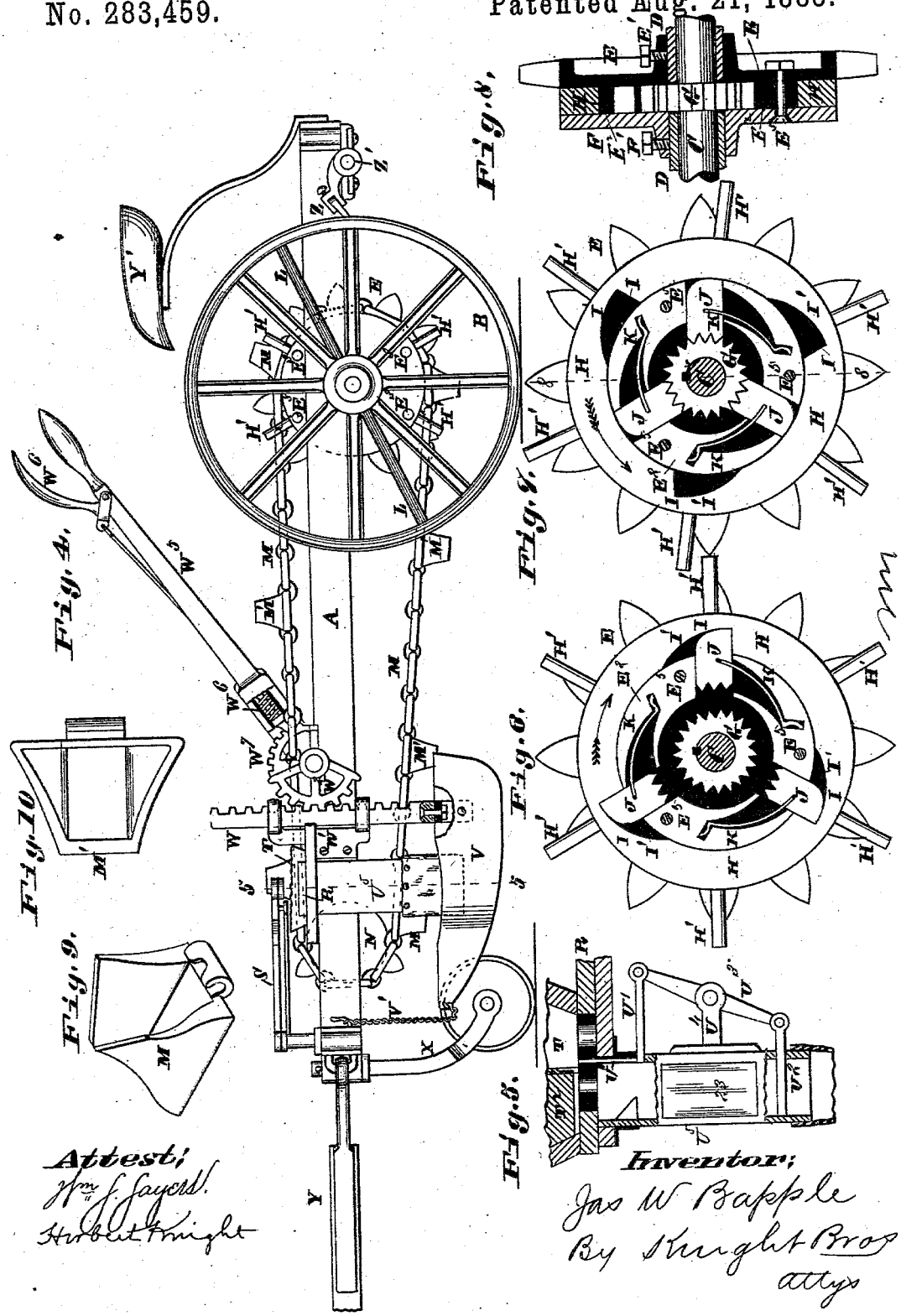

UNITED STATES PATENT OFFICE.

JAMES W. BAPPLE, OF SEDALIA, ASSIGNOR OF ONE-HALF TO JOSEPH ENGLAENDER, OF ST. LOUIS, MISSOURI.

COMBINED SELF-DROPPING CORN-PLANTER AND CHECK-ROWER.

SPECIFICATION forming part of Letters Patent No. 283,459, dated August 21, 1883.

Application filed March 15, 1883. (No model.)

*To all whom it may concern:*

Be it known that I, JAMES W. BAPPLE, of Sedalia, in the county of Pettis and State of Missouri, have invented a certain new and useful Improvement in Combined Self-Dropping Corn-Planter and Check-Rower, of which the following is a full, clear, and exact description, reference being had to the accompanying drawings, forming part of this specification, and in which—

Figure 1 is a top view. Fig. 2 is a side view of the chain-tightener. Fig. 3 is a top view of same. Fig. 4 is a longitudinal section of the machine on line 4 4, Fig. 1; Fig. 5, an enlarged detail vertical section of one of the seed-boxes and dropping attachment on line 5 5, Fig. 4. Fig. 6 is a side view, with the face-plate removed, of the drive-chain wheel, showing it unlocked from the axle of the driving-wheels. Fig. 7 is a similar view, showing it (the wheel) locked on the axle. Fig. 8 is a section of same taken on line 8 8, Fig. 7. Fig. 9 is a perspective view of one of the cams for operating the seed-slides, and Fig. 10 is a modification of same.

My invention relates to certain points of novelty, hereinafter fully described, and pointed out in the claims.

Referring to the drawings, A represents the rectangular frame of the machine; B B, the ground-wheels, and C the axle to which the wheels are rigidly secured. Surrounding the axle is a sleeve or hollow shaft, D, in which the axle turns freely when they are not connected, as hereinafter described, and which is journaled to the frame by suitable boxes. It is made in two parts, to the inner end of one of which (see Fig. 8) is secured a chain-wheel, E, by a set-screw, E', or in any other suitable way, and to the inner end of the other part is secured a disk, F, by a set-screw, F', or by other suitable means. The ends of the two parts of the sleeve are a short distance apart, and between them, rigidly secured to the axle C, is a notched wheel, G. (See Figs. 6, 7, and 8.) The wheel E has a hub, E², filling the space between the body of the wheel and the disk F over the notched wheel G.

H represents a ring fitting over the hub E², between the body of the wheel E and the disk F. The ring has recesses I, (preferably three in number,) with inclined faces I', (see Figs. 6 and 7,) into which blocks J can fit when the ring is turned to the proper position, and they are forced outward by springs K, secured to the hub of the wheel E, (see Fig. 6,) and by turning the ring in the direction indicated by the arrows the blocks are forced inward out of the recesses. (See Fig. 7.) The blocks work through openings in the hub E, and when in their outer position do not engage the notched wheel G, so that the axle turning will not operate the seed-slides, (through means of the chain hereinafter described;) or the chain-wheel can be turned to bring the different parts into their proper relative position, while the axle or ground wheels remain at rest. When the blocks are in their inner position, as shown in Fig. 7, they engage the notched wheel, and thus the axle turning drives the endless chain. The ring H is turned by handle-pins H', and the chain-wheel is turned, when disengaged from the axle, by pin-handles E³. (See Fig. 1.)

L represents markers secured to the sleeves D—two near each wheel. (See Fig. 1.) If, when starting across the field, the markers are not in the proper positions, they can be easily and quickly adjusted by disengaging the chain-wheel from the axle and turning the sleeve, and likewise the cam, which would first operate the seed-slides after the machine is turned around, can also thus be adjusted to the proper position.

M represents an endless chain which passes around the chain-wheel E and around a chain-wheel, N, near the front end of the machine. (See Fig. 4.) The chain has V-shaped cams M' in it, placed suitable distances apart, which operate the seed-slides. The cams form links in the chain, (see Fig. 1,) and are removable, so that their distance apart may be changed at will to regulate the distance apart of the hills of corn. My preferred form of cam is shown in Fig. 9; but its V-shaped vertical sides may be changed to flaring wings, as shown in the modification, Fig. 10. The chain-wheel N is made adjustable in the direction of the length of the chain by its gudgeons being supported in slots O' of arms O, projecting forward from and secured to a cross-beam, P, secured to the sides of the frame of the machine, and a yoke, Q, on the gudgeons (see Fig. 3) having a screw-threaded stem, Q', with a set-screw nut, Q², passing through the cross-piece P, the object being to provide a means for tightening the chain after a link is removed or added.

R represents the seed-slides, (see Fig. 1,) connected by their inner ends to the free ends of arms S, pivoted to the front piece of the frame, as shown. The arms have V-shaped projections S', against which the cams of the chain strike to operate the seed-slides. Springs S² keep the seed-slides pressed toward each other, except when forced apart by the cams.

T represents the seed-boxes, and T' metallic plates secured to the seed-slides within the boxes, (see Fig. 1,) having holes of different sizes for dropping the desired number of grains to the hill, or for dropping different kinds of corn. The holes that do not drop are covered by a block, T², (see Fig. 5,) secured within the seed-boxes. The seed-slides connect with a valve, U, (see Fig. 5,) by a pin, U', and this valve connects with another valve, U², by means of a lever, U³, fulcrumed to the legs U⁵ of the planter by an arm, U⁴. The valves pass through the legs, as shown, and they are automatically and alternately opened and closed by the movement of the seed-slides, thus forming a "double drop."

V represents the shoes of the planter, connected to the forward part of the frame by chains V', and into which the legs U⁵ project. (See Fig. 4.) The shoes are raised, when desired, by means of racks W, secured by their lower ends to the shoes, and working through brackets W', (see Fig. 4,) secured to the frame of the machine. The racks are engaged by cog-sectors W² (see Fig. 1) on a shaft, W³, journaled in boxes W⁴, secured to the frame. Secured to one end of the shaft is a lever, W⁵, having a spring-catch, W⁶, (see Figs. 1 and 4,) which engages with a notched bar, W⁷, secured to the frame, to hold the shoes to any desired vertical adjustment.

The front end of the machine is supported by a caster-wheel, X. (See Figs. 2 and 4.)

Y represents the draft-tongue, pivoted to the frame, as shown in Fig. 1, and Y' represents the driver's seat.

Z represents scrapers for the ground-wheels, secured to a rock-shaft, Z', journaled to the frame by suitable boxes, which is provided with a foot-lever, Z². (See Fig. 1.)

The wheel E may be secured, and preferably is, to the disk F by bolts E⁵. (See Figs. 6, 7, and 8.)

The hollow shaft or sleeve D is preferably cut away in places, as shown in Fig. 1, so as not to have so much bearing-surface on the axle.

23 represents a glass in the legs of the planter to provide a "sight-feed."

I claim as my invention—

1. In a self-dropping corn-planter, the endless chain consisting of links, and cams connecting the links together, in combination with suitable carrying-wheels and seed-slide-operating mechanism, as set forth.

2. In a self-dropping corn-planter, the combination of the endless chain M, having cams M', supporting-wheels E and N, seed-slides R, arms S, pivoted to the frame, having V-shaped projections S', and suitable springs to press on the arms to retract the slides, as set forth.

3. In a self-dropping corn-planter, the combination of frame A, wheels B, axle C, sleeve D, surrounding the axle, and consisting of two parts, chain-wheel E, secured to one part of the sleeve, disk F, secured to the other part of the sleeve, notched wheel G, rigidly secured to the axle between the ends of the two parts of the sleeve, ring H, surrounding the hub E² of the wheel E, and having recess I, with inclined faces I', and spring-blocks J, adapted to engage the wheel G or be released therefrom, substantially as and for the purpose set forth.

4. In a self-dropping corn-planter, the combination of axle C, provided with notched wheel G, sleeve D, the wheel E, having hub E², provided with springs K, radial blocks J, having suitable notches to engage the notched wheel, and pressed out by the springs, and the ring H, having recesses I, formed with inclined faces I', as set forth.

5. In a self-dropping check-rower corn-planter, the combination of an axle, C, having notched wheel G, a sleeve, D, having markers L, the wheel E, having hub E², spring notched blocks J, and the recessed ring H I I', as set forth.

JAMES W. BAPPLE.

In presence of—
 SAML. KNIGHT,
 GEO. H. KNIGHT.